W. YOUNG.
Apparatus for Tapping Water-Mains.

No. 136,950. Patented March 18, 1873.

Witnesses:
Chas. Nida
Sedgwick

Inventor:
W. Young
per
Attorneys.

UNITED STATES PATENT OFFICE.

WILLIAM YOUNG, OF EASTON, PENNSYLVANIA.

IMPROVEMENT IN APPARATUS FOR TAPPING WATER-MAINS.

Specification forming part of Letters Patent No. 136,950, dated March 18, 1873.

*To all whom it may concern:*

Be it known that I, WILLIAM YOUNG, of Easton, in the county of Northampton and State of Pennsylvania, have invented a new and Improved Apparatus for Tapping Water-Mains, of which the following is a specification:

The invention consists in the improvement of machines for tapping mains, as hereinafter described and pointed out in the claim.

Figure 1:
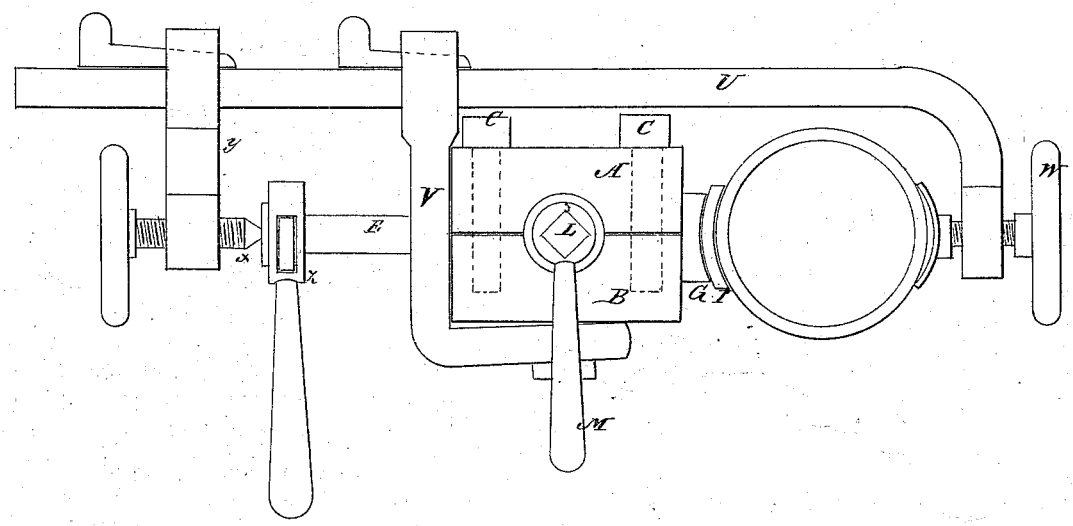
Figure 2:
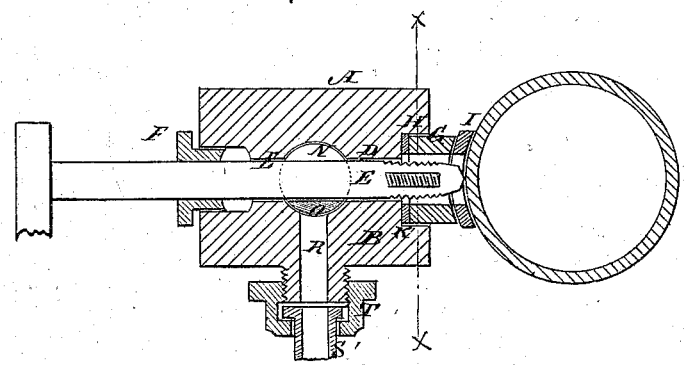
Figure 3:
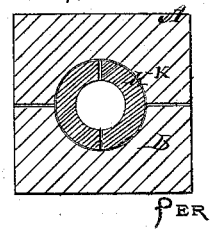

Figure 1 is a side elevation of my improved apparatus for tapping water-mains while the water is on. Fig. 2 is a sectional elevation; and Fig. 3 is a sectional elevation of Fig. 2 taken on the line $x$ $x$.

Similar letters of reference indicate corresponding parts.

A and B represent the two parts of the drill-case, which are clamped tightly together by the bolts C, and have a hole, D, formed half in each part for the drill E, with a stuffing-box, F, in the outer end, and a detachable washer, G, in a socket, H, at the outer end, with a concave face suited to the convexity of the pipe to be clamped against a packing-gasket, I, on the side of the pipe to make a water-tight joint. There is also a gasket, K, in the bottom of the socket H. These gaskets and the washer are made in two parts so as to be removed when the pipe is put in, which has a stop-cock which prevents them from being slipped off over the end. L is the cock traversing the drill-hole to close it when the drill is drawn out. It has a handle, M, on the outside for turning it; and has a deep notch, N, cut in it coinciding with the drill-hole, to let the drill pass into the pipe for drilling the hole when it is adjusted to the position represented in Fig. 2.

After the hole is drilled and the point of the drill drawn back beyond the cock, the latter is turned so that the part O comes up and stops the hole. The drill is then drawn out through the stuffing-box F, and the pipe to be screwed in the hole is put in through the stuffing-box; the cock is turned back again, and the pipe is pushed forward and screwed into the water-main; and then the apparatus is removed.

R is a passage for blowing out the chips by the water. It may either have a pipe-connection, S, fastened on in connection with it for conducting the washings away by a flexible pipe, or it may be entirely closed by a screw-cap, to be taken off when the drill-case is to be washed out.

The drill-case is clamped on the pipe by the ordinary clamp U V W; and the feed-screw X for the drill is held by an arm, Y, on the bar U. The drill is worked by a ratchet, pawl, and lever, Z.

Having thus described my invention, I claim as new and desire to secure by Letters Patent—

The case A B provided with notched cock L N, the drill E, the packing F, the washer G, and the gasket I, combined, constructed, and arranged as and for the purpose set forth.

WILLIAM YOUNG.

Witnesses:
   NELSON HOYT,
   WILLIAM EVERHART.